United States Patent
Kataoka et al.

(10) Patent No.: US 10,755,028 B2
(45) Date of Patent: Aug. 25, 2020

(54) ANALYSIS METHOD AND ANALYSIS DEVICE

(71) Applicant: FUJITSU LIMITED, Kawasaki-shi, Kanagawa (JP)

(72) Inventors: Masahiro Kataoka, Kamakura (JP); Satoshi Onoue, Yokohama (JP); Hiroyuki Yoshida, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/902,001

(22) Filed: Feb. 22, 2018

(65) Prior Publication Data

US 2018/0246856 A1    Aug. 30, 2018

(30) Foreign Application Priority Data

Feb. 28, 2017   (JP) .................. 2017-036288

(51) Int. Cl.
| | | |
|---|---|---|
| *G06F 40/10* | (2020.01) | |
| *G06F 40/284* | (2020.01) | |
| *G06F 40/289* | (2020.01) | |
| *G06N 20/00* | (2019.01) | |
| *G06F 16/35* | (2019.01) | |

(52) U.S. Cl.
CPC ............ *G06F 40/10* (2020.01); *G06F 40/284* (2020.01); *G06F 40/289* (2020.01); *G06F 16/35* (2019.01); *G06N 20/00* (2019.01)

(58) Field of Classification Search
CPC ........ G06F 17/277; G06F 16/35; G06F 17/21; G06F 17/2775; G06F 17/278; G06N 20/00; G06N 3/0472; G10L 15/197
See application file for complete search history.

(56) References Cited

U.S. PATENT DOCUMENTS

| | | | | |
|---|---|---|---|---|
| 9,037,464 B1* | 5/2015 | Mikolov | ............. | G06F 17/2785 704/255 |
| 10,121,467 B1* | 11/2018 | Gandhe | ................. | G10L 15/197 |
| 2006/0020607 A1 | 1/2006 | Patterson | | |
| 2014/0229158 A1* | 8/2014 | Zweig | ...................... | G06N 3/04 704/9 |

FOREIGN PATENT DOCUMENTS

| | | |
|---|---|---|
| EP | 2056221 | 5/2009 |
| JP | 2006-48685 | 2/2006 |
| JP | 2009-151757 | 7/2009 |

OTHER PUBLICATIONS

Tomas Mikolov et al., "Distributed Representations of Words and Phrases and their Compositionality", Advances in Neural Information Processing Systems 26, Curran Associates, Inc., 2013 (9 pages).

(Continued)

*Primary Examiner* — Thomas H Maung
(74) *Attorney, Agent, or Firm* — Fujitsu Patent Center (57) ABSTRACT

An analysis device includes a memory and a processor configured to acquire a document for analyzing, generate a coded document including a plurality of coded words by coding the document for each word unit, determine a vector value according to a condition of appearance of a first coded phrase in the coded document, the first coded phrase corresponding to a combination of two or more coded words included in the plurality of coded words, and assign the vector value to the first coded phrase.

11 Claims, 10 Drawing Sheets

(56) References Cited

OTHER PUBLICATIONS

Nikolov, Tomas et al., "Efficient Estimation of Word Representations in Vector Space", pp. 1-12, Retrieved from the Internet: URL:http://arxiv.org/abs/1301.3781, Jan. 16, 2013, XP055192736.
Extended European Search Report dated Aug. 1, 2018 for corresponding European Patent Application No. 18158086.1, 5 pages.

* cited by examiner

PERFORM REARRANGEMENT SUCH THAT WORDS OF PHRASE ARE CONTIGUOUS TO EACH OTHER

CALCULATE VECTOR VALUES AS IN FIRST EMBODIMENT

| MAIN WORD | SUB-WORD | PHRASE |
|---|---|---|
| ... | ... | ... |
| figure | out | figure out |
| take | out | take out |
| turn | off | turn off |
| put | out | put out |
| make | out | make out |
| ... | ... | ... |

ANALYSIS METHOD AND ANALYSIS DEVICE

CROSS-REFERENCE TO RELATED APPLICATION

This application is based upon and claims the benefit of priority of the prior Japanese Patent Application No. 2017-36288, filed on Feb. 28, 2017, the entire contents of which are incorporated herein by reference.

FIELD

The present disclosure is related to analysis technology.

BACKGROUND

As a method of distributed representation of a document, there is a Word2Vec technology that generates vectors from the document based on each of morphemes constituting the document to be analyzed. For example, the Word2Vec technology performs processing of calculating the vector value of each word based on relation between a certain word (morpheme) and another word adjacent to the certain word.

Here, when the Word2Vec technology or the like performs the distributed representation of a document using vectors, highly frequent words included in the document to be analyzed have an excessively great effect, the highly frequent words including articles such as "the," "a," and the like and prepositions such as "on," "of," and the like. Therefore, the Word2Vec technology generates the distributed representation using vectors after excluding the highly frequent words as stop words from the document.

For example, the Word2Vec technology excludes "of" as a stop word from a document to be analyzed, "He takes care of his daughter," and then vectorizes each of the words included in "He takes care his daughter."

Related technologies are disclosed in, for example, Japanese Laid-open Patent Publication No. 2006-48685, Japanese Laid-open Patent Publication No. 2009-151757, and Distributed Representations of Words and Phrases and their Compositionality, Tomas Mikolov et. al, pp. 3111-3119, Advances in Neural Information Processing Systems 26, 2013, Curran Associates, Inc.

SUMMARY

According to an aspect of the invention, an analysis device includes a memory and a processor configured to acquire a document for analyzing, generate a coded document including a plurality of coded words by coding the document for each word unit, determine a vector value according to a condition of appearance of a first coded phrase in the coded document, the first coded phrase corresponding to a combination of two or more coded words included in the plurality of coded words, and assign the vector value to the first coded phrase.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the conventional technology, there are problems of low speed of analysis and low accuracy of analysis of the document to be analyzed. Articles such as "the," "a," and the like and prepositions such as "on," "of," and the like excluded as stop words by the Word2Vec technology may change meanings depending on the presence or absence thereof in particular character strings. For example, "of" in "take care of" or "the" in "the Japanese" changes the meaning depending on the presence or absence thereof. Thus, when vectorization is performed with such "of," "the," or the like excluded, vectorization in a state in which the meanings of an original document are changed is performed. Accuracy of analysis using generated vectors may therefore be decreased.

In addition, an analysis method is not known in which an amount of calculation including stop words does not become excessive in the analysis used by the Word2Vec technology. It is therefore difficult to achieve target accuracy by taking an appropriate calculation time.

Embodiments of an analyzing program, an analysis method, and an analysis device disclosed in the present application will hereinafter be described in detail with reference to the drawings. It is to be noted that the present embodiments do not limit the present disclosure.

First Embodiment

Figure 1:
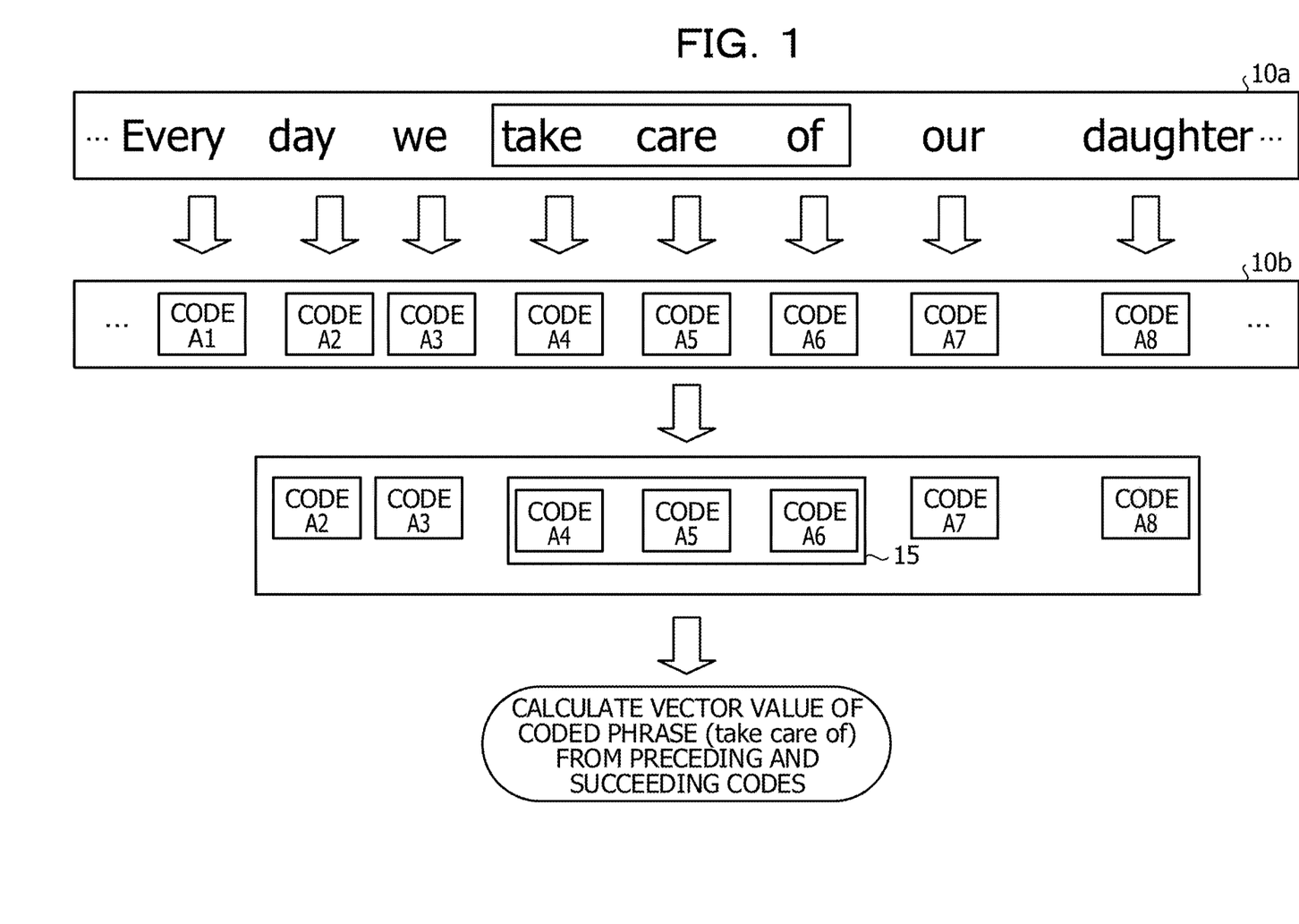
FIG. 1 is a diagram of assistance in explaining an example of processing of an analysis device according to a present first embodiment.

FIG. 1 is a diagram of assistance in explaining an example of processing of an analysis device according to a present first embodiment. The following description will be made of a case where the analysis device vectorizes coded data 10b obtained by coding text data 10a. Suppose that the text data 10a in the example illustrated in FIG. 1 is "Every day we take care of our daughter."

The analysis device identifies a set of a plurality of words constituting a given phrase among words included in the text data 10a by comparing a phrase definition table defining given phrases with the text data 10a. In the example illustrated in FIG. 1, "take care of" is identified as a given phrase.

The analysis device generates the coded data 10b by coding the words of the text data 10a in word units by comparing dictionary data, which associates words with codes, with the words included in the text data 10a. For example, the analysis device codes the word "Every" into a code A1, the word "day" into a code A2, and the word "we" into a code A3, and the word take into a code A4. The analysis device codes the word "care" into a code A5, the word "of" into a code A6, the word "our" into a code A7, and the word "daughter" into a code A8.

The analysis device identifies a set of codes of words constituting a given phrase and codes not corresponding to the words constituting the given phrase among a plurality of codes. In the following description, the set of the codes of the words constituting the given phrase will be expressed as a "coded phrase" as appropriate. The codes not corresponding to the words constituting the given phrase will be expressed as "coded words." In the example illustrated in FIG. 1, the set of the codes A4 to A6 is a coded phrase 15. The other codes A1 to A3, A7, and A8 are each a coded word.

The analysis device vectorizes the coded data 10b by calculating respective vector values of the coded words and the coded phrase according to conditions of appearance of the coded words and the coded phrase.

Description will be made of processing in which the analysis device calculates the vector value of a coded word. A coded word for which to calculate a vector value will be expressed as a target word. The analysis device calculates the vector value of the target word by applying modeling based on Skip-gram to two coded words or coded phrases in front of the target word and two coded words in the rear of the target word in the coded data 10b, and identifying a probability that the coded words or the coded phrases appear in front and in the rear of the target word.

For example, when the analysis device calculates the vector value of the code A3, the analysis device applies modeling based on Skip-gram to the code A1, the code A2, the coded phrase 15, and the code A7. The analysis device calculates the vector value of the code A3 by identifying a probability that the code A1, the code A2, the coded phrase 15, and the code A7 appear in front and in the rear of the code A3. The analysis device also performs similar processing for the codes A1, A2, A7, and A8, and thereby calculates the vector values of the respective codes.

Description will be made of processing in which the analysis device calculates the vector value of a coded phrase. A coded phrase for which to calculate a vector value will be expressed as a target phrase. The analysis device calculates the vector value of the target phrase by applying modeling based on Skip-gram to two coded words or coded phrases in front of the target phrase and two coded words in the rear of the target phrase in the coded data 10b, and identifying a probability that the coded words or the coded phrases appear in front and in the rear of the target phrase.

For example, when the analysis device calculates the vector value of the coded phrase 15, the analysis device applies modeling based on Skip-gram to the code A2, the code A3, the code A7, and the code A8. The analysis device calculates the vector value of the coded phrase 15 by identifying a probability that the code A2, the code A3, the code A7, and the code A8 appear in front and in the rear of the coded phrase 15. The analysis device also performs similar processing for other coded phrases, and thereby calculates the vector values of the respective codes.

The analysis device vectorizes the coded data 10b by assigning corresponding vector values to the respective coded words and the respective coded phrases.

As described above, the analysis device according to the present first embodiment generates the coded data 10b by performing coding in word units without excluding stop words from the words included in the text data 10a. The analysis device puts together, as the coded phrase, the coded words constituting the given phrase among the coded words, and vectorizes the coded data 10b according to the conditions of appearance of the coded words and the coded phrase. Thus, the analysis device does not exclude stop words. It is therefore possible to improve analysis accuracy when vectorizing the coded data 10b. In addition, in coding used by the analysis device, the coded data 10b is coded in word units. Thus, unlike coding by Zip, each word may be distinguished while remaining in a coded state. The vector values of words included in a document may therefore be calculated without decoding being performed. Analysis speed may consequently be improved.

Figure 2:
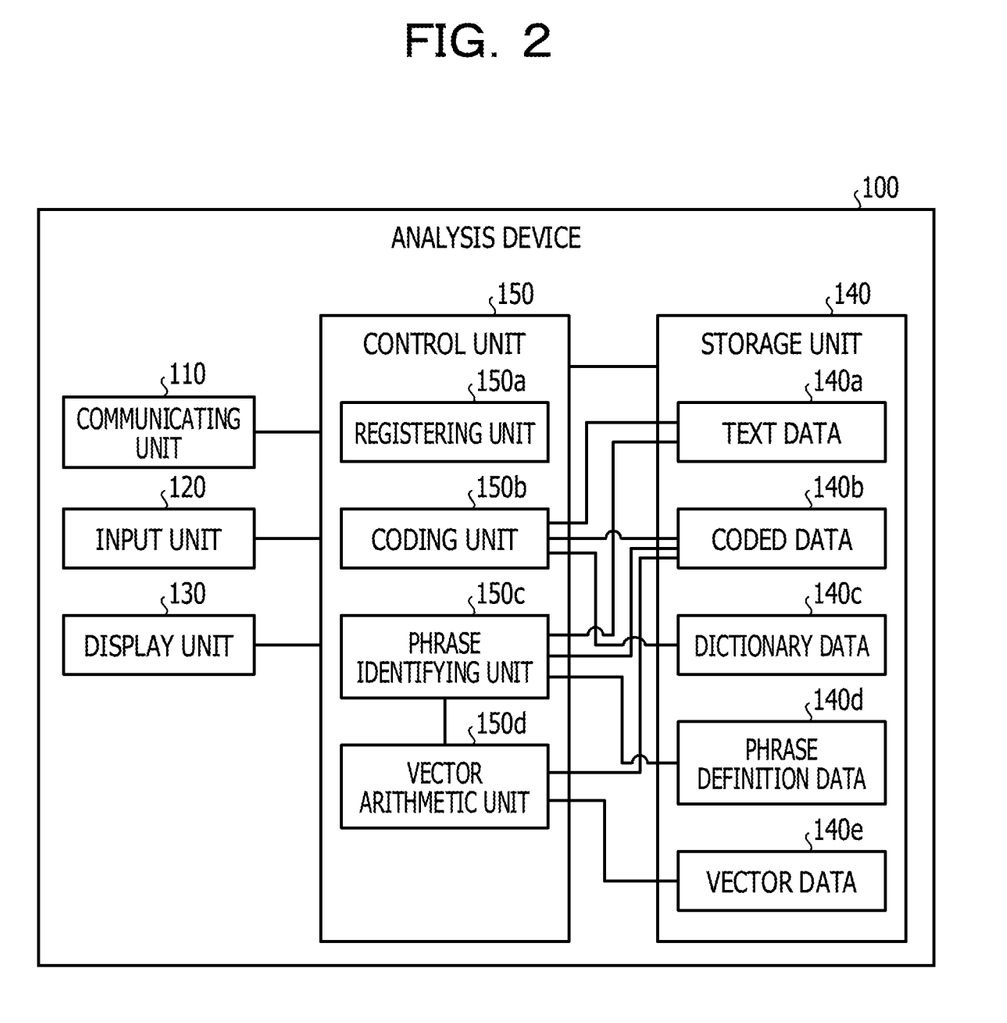
FIG. 2 is a functional block diagram illustrating a configuration of an analysis device according to the present first embodiment.

FIG. 2 is a functional block diagram illustrating a configuration of an analysis device according to the present first embodiment. As illustrated in FIG. 2, the analysis device 100 includes a communicating unit 110, an input unit 120, a display unit 130, a storage unit 140, and a control unit 150.

The communicating unit 110 is a processing unit that communicates with another external device via a network. For example, the analysis device 100 may receive text data 140a, dictionary data 140c, phrase definition data 140d, and the like to be described later via the communicating unit 110.

The input unit 120 is an input device that inputs various kinds of information to the analysis device 100. The input unit 120, for example, corresponds to a keyboard, a mouse, a touch panel, and the like.

The display unit 130 is a display device that displays various kinds of information output from the control unit 150. The display unit 130, for example, corresponds to a liquid crystal display, a touch panel, and the like.

The storage unit 140 includes text data 140a, coded data 140b, dictionary data 140c, phrase definition data 140d, and vector data 140e. The storage unit 140 corresponds to a semiconductor memory element such as a random access memory (RAM), a read only memory (ROM), a flash memory, or the like, and a storage device such as a hard disk drive (HDD) or the like.

The text data 140a is character string data including a plurality of words. An example of the text data 140a is the text data 10a illustrated in FIG. 1.

The coded data 140b is data obtained by coding each word included in the text data 140a in word units. An example of the coded data 140b is the coded data 10b illustrated in FIG. 1.

The dictionary data 140c is data associating words with codes corresponding to the words.

Figure 3:
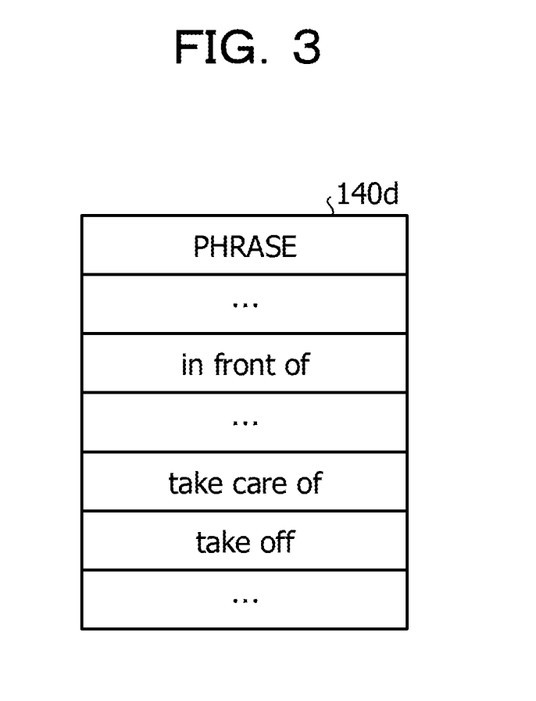
FIG. 3 is a diagram illustrating an example of a data structure of phrase definition data.

The phrase definition data 140d is data defining combinations of pluralities of words constituting phrases. FIG. 3 is a diagram illustrating an example of a data structure of phrase definition data. As illustrated in FIG. 3, various phrases are defined as the phrase definition data 140d. The phrases illustrated in FIG. 3 are an example, and other phrases are also included.

In FIG. 3, as an example, phrases are defined as sets of words before coding. However, there is no limitation to this. For example, the phrase definition data 140d may define words constituting phrases by codes after coding. For example, "in front of" may be define by "(code of in), (code of front), and (code of of)."

The vector data 140e is information indicating vector values assigned to each coded word and each coded phrase included in the coded data 140b, and is information obtained by vectorizing the coded data 140b.

The control unit 150 includes a registering unit 150a, a coding unit 150b, a phrase identifying unit 150c, and a vector arithmetic unit 150d. The control unit 150 may be implemented by a central processing unit (CPU), a micro processing unit (MPU), or the like. The control unit 150 may also be implemented by hard wired logic such as an application specific integrated circuit (ASIC), a field programmable gate array (FPGA), or the like.

The registering unit 150a is a processing unit that, when receiving various kinds of information via the communicating unit 110 or the input unit 120, registers the received information in the storage unit 140. For example, when the registering unit 150a receives the text data 140a, the dictionary data 140c, and the phrase definition data 140d, the registering unit 150a registers the received text data 140a, the received dictionary data 140c, and the received phrase definition data 140d in the storage unit 140.

The coding unit 150b is a processing unit that codes the text data 140a. The coding unit 150b generates the coded data 140b by repeatedly performing processing of comparing each word included in the text data 140a with the dictionary data 140c, and coding words hit in the dictionary data 140c in word units.

The phrase identifying unit 150c is a processing unit that identifies a set of coded words constituting a coded phrase among the coded words included in the coded data 140b based on the phrase definition data 140d. The phrase identifying unit 150c outputs information related to the set of the coded words constituting the coded phrase among the codes of the coded data 140b to the vector arithmetic unit 150d.

Description will be made of processing in a case where a phrase defined in the phrase definition data 140d is defined as a set of words before coding. The phrase identifying unit 150c identifies the set of the words constituting the phrase included in the text data 140a by comparing the text data 140a with the phrase definition data 140d. The phrase identifying unit 150c identifies respective codes corresponding to the identified set of the words constituting the phrase based on the dictionary data 140c. The phrase identifying unit 150c identifies a coded phrase present in the coded data 140b by comparing the respective identified codes with the coded data 140b.

Description will be made of processing in a case where a phrase defined in the phrase definition data 140d is defined as a set of codes after coding. The phrase identifying unit 150c identifies the coded phrase included in the coded data 140b by comparing the coded data 140b with the phrase definition data 140d.

The vector arithmetic unit 150d is a processing unit that generates the vector data 140e by calculating and assigning respective vector values of coded words and coded phrases included in the coded data 140b according to the conditions of appearance of the coded words and the coded phrases. The vector arithmetic unit 150d is an example of an arithmetic unit.

The vector arithmetic unit 150d receives an identification result from the phrase identifying unit 150c, and distinguishes coded words corresponding to a coded phrase among the coded words included in the coded data 140b from coded words not corresponding to the coded phrase. The vector arithmetic unit 150d calculates the vector value of the coded phrase and the vector values of the coded words not corresponding to the coded phrase.

Description will be made of processing in which the vector arithmetic unit 150d calculates the vector value of a coded word. A coded word for which to calculate a vector value will be expressed as a target word. The vector arithmetic unit 150d calculates the vector value of the target word by applying modeling based on Skip-gram to two coded words or coded phrases in front of the target word and two coded words in the rear of the target word in the coded data 140b, and identifying a probability that the coded words or the coded phrases appear in front and in the rear of the target word.

When description is made with reference to FIG. 1, in a case where the vector arithmetic unit 150d calculates the vector value of the code A3, the vector arithmetic unit 150d applies modeling based on Skip-gram to the code A1, the code A2, the coded phrase 15, and the code A7. The vector arithmetic unit 150d calculates the vector value of the code A3 by identifying a probability that the code A1, the code A2, the coded phrase 15, and the code A7 appear in front and in the rear of the code A3. The analysis device also performs similar processing for the codes A1, A2, A7, and A8, and thereby calculates the vector values of the respective codes.

Description will be made of processing in which the vector arithmetic unit 150d calculates the vector value of a coded phrase. A coded phrase for which to calculate a vector value will be expressed as a target phrase. The vector arithmetic unit 150d calculates the vector value of the target phrase by applying modeling based on Skip-gram to two coded words or coded phrases in front of the target phrase and two coded words in the rear of the target phrase in the coded data 140b, and identifying a probability that the coded words or the coded phrases appear in front and in the rear of the target phrase.

When description is made with reference to FIG. 1, in a case where the vector arithmetic unit 150d calculates the vector value of the coded phrase 15, the vector arithmetic unit 150d applies modeling based on Skip-gram to the code A2, the code A3, the code A7, and the code A8. The vector arithmetic unit 150d calculates the vector value of the coded phrase 15 by identifying a probability that the code A2, the code A3, the code A7, and the code A8 appear in front and in the rear of the coded phrase 15. The vector arithmetic unit 150d also performs similar processing for other coded phrases, and thereby calculates the vector values of the respective codes.

Here, a technology described in a document (Tomas Mikolov et al., "Distributed Representations of Words and Phrases and their Compositionality"), for example, is used for the processing in which the vector arithmetic unit 150d performs modeling based on Skip-gram, and calculates the vector value of the target word (target phrase).

Figure 4:
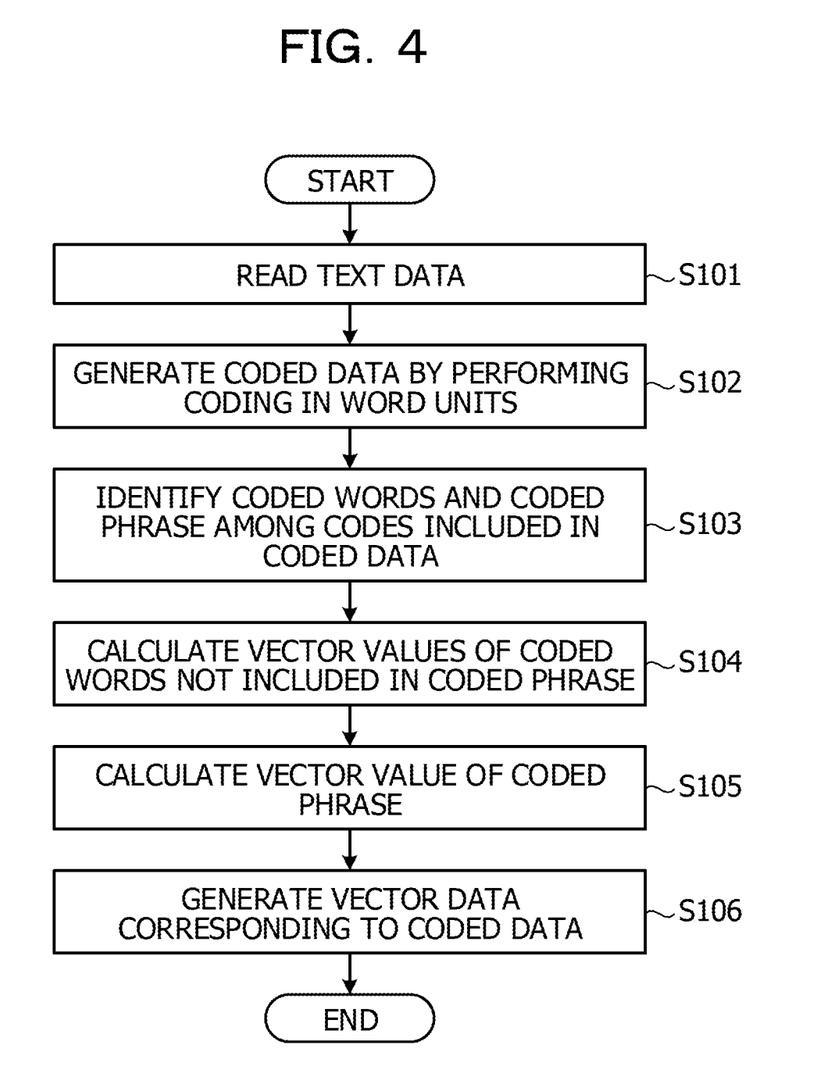
FIG. 4 is a flowchart illustrating a processing procedure of an analysis device according to the present first embodiment.

FIG. 4 is a flowchart illustrating a processing procedure of an analysis device according to the present first embodiment. As illustrated in FIG. 4, the coding unit 150b of the analysis device 100 reads the text data 140a (step S101). The coding unit 150b generates the coded data 140b by coding the text data 140a in word units based on the dictionary data 140c (step S102).

The phrase identifying unit 150c of the analysis device 100 identifies coded words (coded words not included in a coded phrase) and the coded phrase among the codes included in the coded data 140b based on the phrase definition data 140d (step S103).

The vector arithmetic unit 150d of the analysis device 100 calculates the vector values of the coded words not included in the coded phrase according to the conditions of appearance of the coded words (step S104). The vector arithmetic unit 150d calculates the vector value of the coded phrase according to the conditions of appearance of the coded phrase (step S105). The vector arithmetic unit 150d generates the vector data 140e corresponding to the coded data 140b (step S106).

As described above, the analysis device 100 generates the coded data 140b by performing coding in word units without excluding stop words from the words included in the text data 140a. The analysis device 100 puts together, as the coded phrase, the coded words constituting the given phrase among the coded words, and vectorizes the coded data 140b according to the conditions of appearance of the coded words and the coded phrase. Thus, the analysis device 100 does not exclude stop words. It is therefore possible to improve analysis accuracy when vectorizing the coded data 140b. In addition, in coding used by the analysis device 100, the coded data 140b is coded in word units. Thus, unlike coding by Zip, each word may be distinguished while remaining in a coded state. The vector values of words included in a document may therefore be calculated without decoding being performed. Analysis speed may consequently be improved.

Second Embodiment

Figure 5:
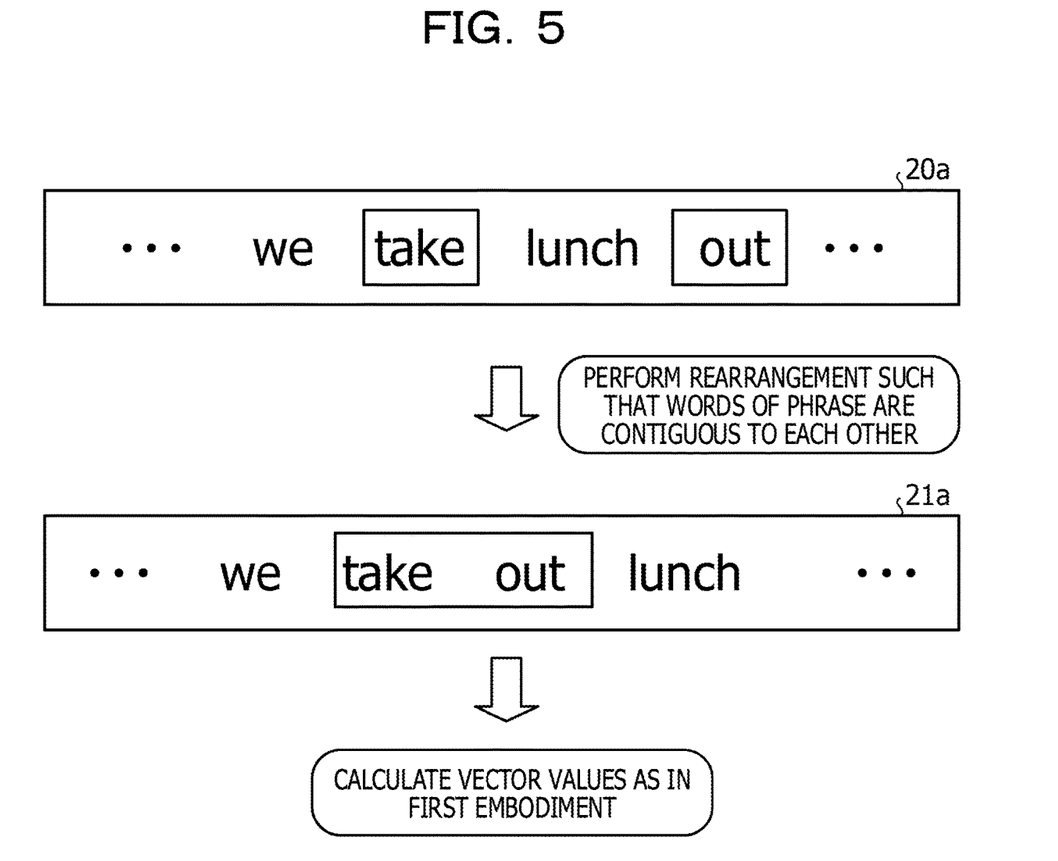
FIG. 5 is a diagram of assistance in explaining an example of processing of an analysis device according to a present second embodiment.

FIG. 5 is a diagram of assistance in explaining an example of processing of an analysis device according to a present second embodiment. Suppose in the following that text data 20a analyzed by the analysis device is "We take lunch out." "take" and "out" included in the text data 20a are a set of words corresponding to a phrase. However, the words are separated from each other, and therefore are not hit in the phrase definition data 140d used by the analysis device 100 described in the first embodiment, so that the vector value of a coded phrase may not be calculated. In the following description, a phrase formed by words separated from each other will be expressed as a "separated phrase."

When the analysis device according to the present second embodiment detects a separated phrase while scanning the text data 20a, the analysis device generates text data 21a by rearranging words of the text data 20a such that words constituting the separated phrase are contiguous to each other. For example, in the example illustrated in FIG. 5, an analysis device 200 generates the text data 21a by deleting "out" in the text data 20a, and disposing the deleted "out" immediately in the rear of "take." The analysis device vectorizes the text data 21a based on the text data 21a (coded data obtained by coding the text data 21a). The processing in which the analysis device vectorizes the text data 21a based on the text data 21a is similar to the processing of the foregoing first embodiment.

By performing the above-described processing, the analysis device according to the present second embodiment may identify a separated phrase as a coded phrase even when the separated phrase is present in the text data 20a. Therefore, it is possible to suppress calculation of a vector value for each of the codes of words constituting the separated phrase, and improve analysis accuracy.

Figure 6:
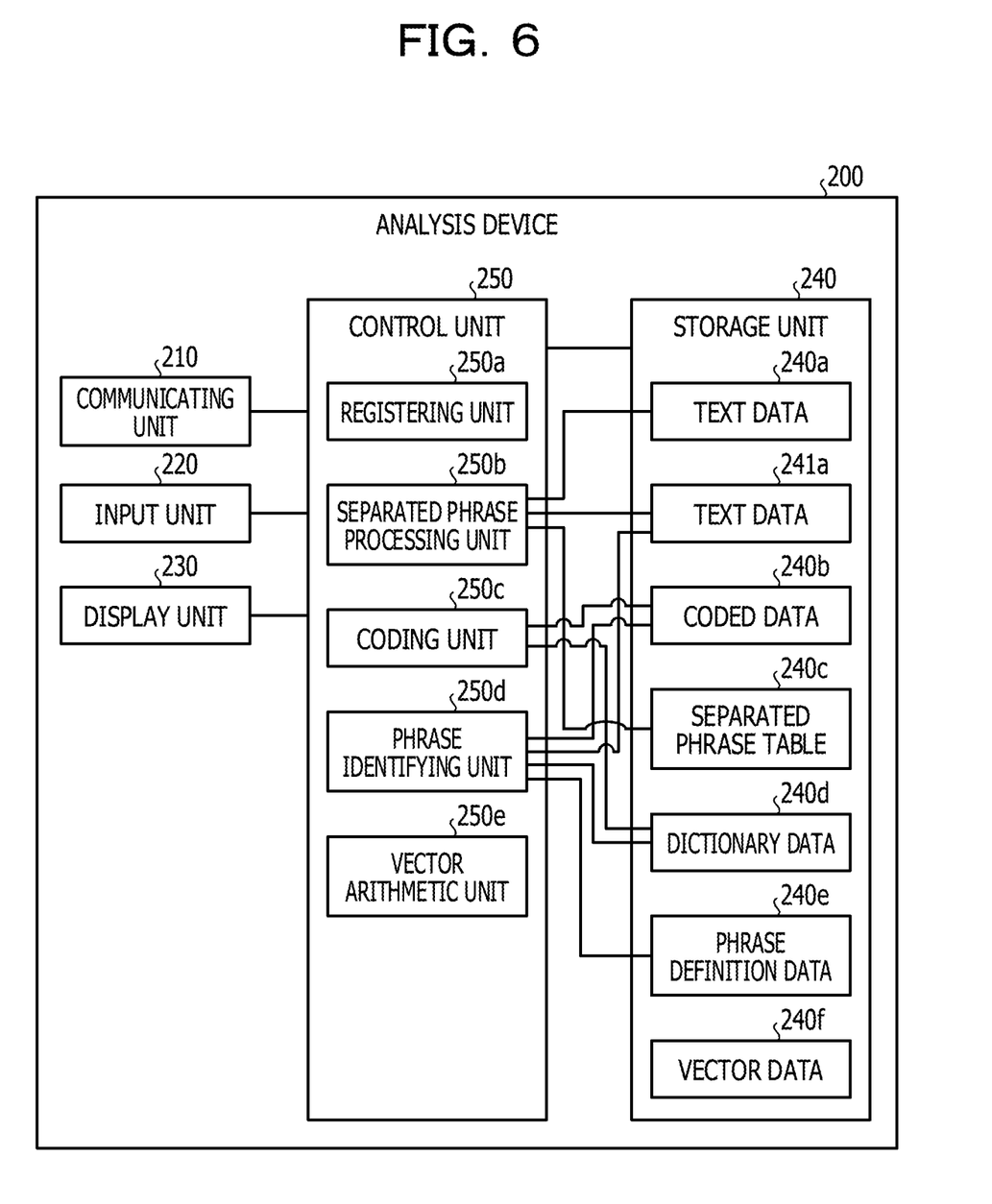
FIG. 6 is a functional block diagram illustrating a configuration of an analysis device according to the present second embodiment.

FIG. 6 is a functional block diagram illustrating a configuration of an analysis device according to the present second embodiment. As illustrated in FIG. 6, the analysis device 200 includes a communicating unit 210, an input unit 220, a display unit 230, a storage unit 240, and a control unit 250. Description of the input unit 220 and the display unit 230 among these units is similar to the description of the input unit 120 and the display unit 130 described with reference to FIG. 2, and therefore the description will be omitted.

The communicating unit 210 is a processing unit that communicates with another external device via a network. For example, the analysis device 200 may receive text data 240a, a separated phrase table 240c, dictionary data 240d, phrase definition data 240e, and the like to be described later via the communicating unit 210.

The storage unit 240 includes text data 240a, text data 241a, coded data 240b, a separated phrase table 240c, dictionary data 240d, phrase definition data 240e, and vector data 240f. The storage unit 240 corresponds to a semiconductor memory element such as a RAM, a ROM, a flash memory, or the like, and a storage device such as an HDD or the like.

The text data 240a is character string data including a plurality of words. An example of the text data 240a is the text data 20a illustrated in FIG. 5. The text data 241a is data in which words are rearranged such that the words of a separated phrase are contiguous to each other as described with reference to FIG. 5, and which corresponds to the text data 21a.

The coded data 240b is data obtained by coding each word included in the text data 241a in word units.

Figure 7:
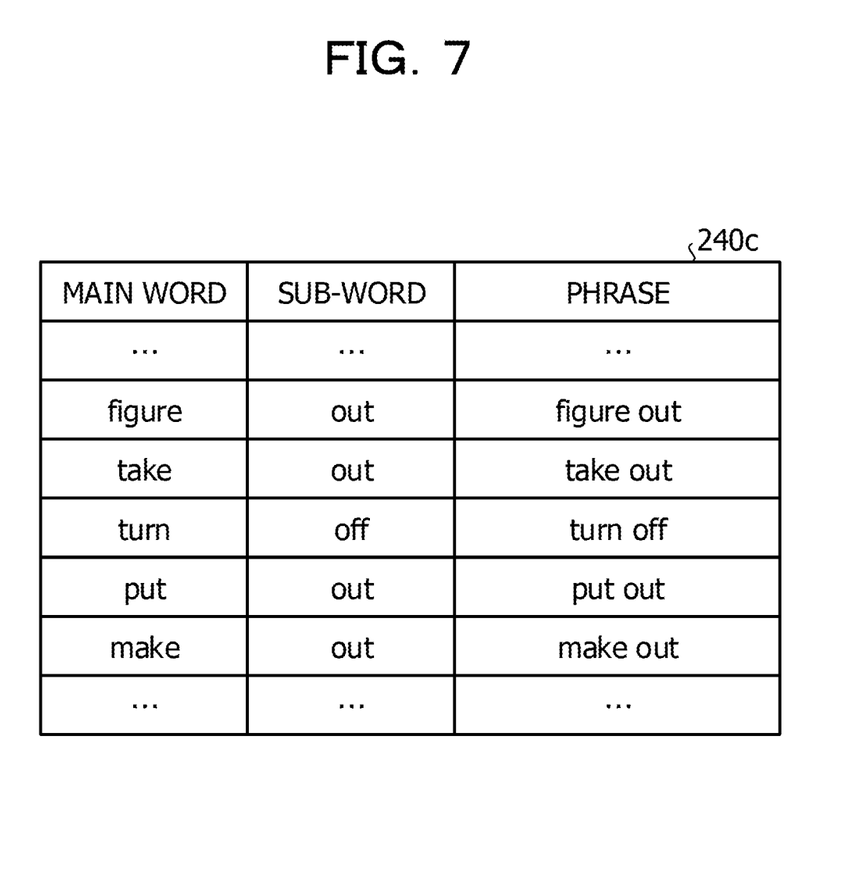
FIG. 7 is a diagram illustrating an example of a data structure of a separated phrase table.

The separated phrase table 240c is a table defining information related to separated phrases. FIG. 7 is a diagram illustrating an example of a data structure of a separated phrase table. As illustrated in FIG. 7, the separated phrase table 240c associates main words, sub-words, and phrases. A main word is a word appearing first in a separated phrase. A sub-word is a word appearing after the main word in the separated phrase. A phrase is formed by contiguously arranging the words constituting the separated phrase.

Description of the dictionary data 240d and the phrase definition data 240e is similar to the description of the dictionary data 140c and the phrase definition data 140d described with reference to FIG. 2.

The vector data 240f is information indicating vector values assigned to each coded word and each coded phrase included in the coded data 240b, and is information obtained by vectorizing the coded data 240b.

The control unit 250 includes a registering unit 250a, a separated phrase processing unit 250b, a coding unit 250c, a phrase identifying unit 250d, and a vector arithmetic unit 250e. The control unit 250 may be implemented by a CPU, an MPU, or the like. The control unit 250 may also be implemented by hard wired logic such as an ASIC, an FPGA, or the like.

The registering unit 250a is a processing unit that, when receiving various kinds of information via the communicating unit 210 or the input unit 220, registers the received information in the storage unit 240. For example, when the registering unit 250a receives the text data 240a, the separated phrase table 240c, the dictionary data 240d, and the phrase definition data 240e, the registering unit 250a registers each of the received pieces of data in the storage unit 240.

The separated phrase processing unit 250b compares the text data 240a with the separated phrase table 240c, and identifies a separated phrase included in the text data 240a. The separated phrase processing unit 250b generates the text data 241a by performing rearrangement such that the words of the identified separated phrase are contiguous to each other. In the following, description will be made of an example of processing of the separated phrase processing unit 250b.

The separated phrase processing unit 250b compares the text data 240a with the separated phrase table 240c, and identifies a word hit as a main word in the separated phrase table 240c from the text data 240a. When there is a word hit as a main word, the separated phrase processing unit 250b determines whether or not a sub-word (sub-word corresponding to the main word) is hit at a position less than a given number of words from the hit word in a rearward direction in a same sentence as the hit word. When the main word and the sub-word are hit, the separated phrase table 240c identifies the main word and the sub-word as a separated phrase.

Suppose, for example, that the separated phrase processing unit 250b compares the text data 240a with the separated phrase table 240c, and hits the main word "take." When the sub-word "out" is present at a position less than a given number of words from "take" in the rearward direction in the same sentence as the hit main word "take," the separated phrase processing unit 250b identifies "take" and "out," which are separated from each other, as a separated phrase.

When the separated phrase processing unit 250b identifies the separated phrase, the separated phrase processing unit 250b performs processing of deleting the sub-word of the separated phrase, and disposing the sub-word immediately in the rear of the main word. The separated phrase processing unit 250b generates the text data 241a by repeatedly performing the above-described processing for each separated phrase.

Incidentally, the separated phrase processing unit 250b may perform replacement so as to make the main word and the sub-word contiguous to each other by replacing the main word with the phrase, and deleting the sub-word.

The coding unit 250c is a processing unit that codes the text data 241a. The coding unit 250c generates the coded data 240b by repeatedly performing processing of comparing each word included in the text data 241a with the dictionary data 240d, and coding words hit in the dictionary data 240d in word units.

The phrase identifying unit 250d is a processing unit that identifies a set of coded words constituting a coded phrase among the coded words included in the coded data 240b based on the phrase definition data 240e. The phrase identifying unit 250d outputs information related to the set of the coded words constituting the coded phrase among the codes of the coded data 240b to the vector arithmetic unit 250e. Other processing of the phrase identifying unit 250d is similar to the processing of the phrase identifying unit 150c illustrated in FIG. 2.

The vector arithmetic unit 250e is a processing unit that generates the vector data 240f by calculating and assigning respective vector values of coded words and coded phrases included in the coded data 240b according to the conditions of appearance of the coded words and the coded phrases. Other processing of the vector arithmetic unit 250e is similar to the processing of the vector arithmetic unit 150d described with reference to FIG. 2.

Figure 8:
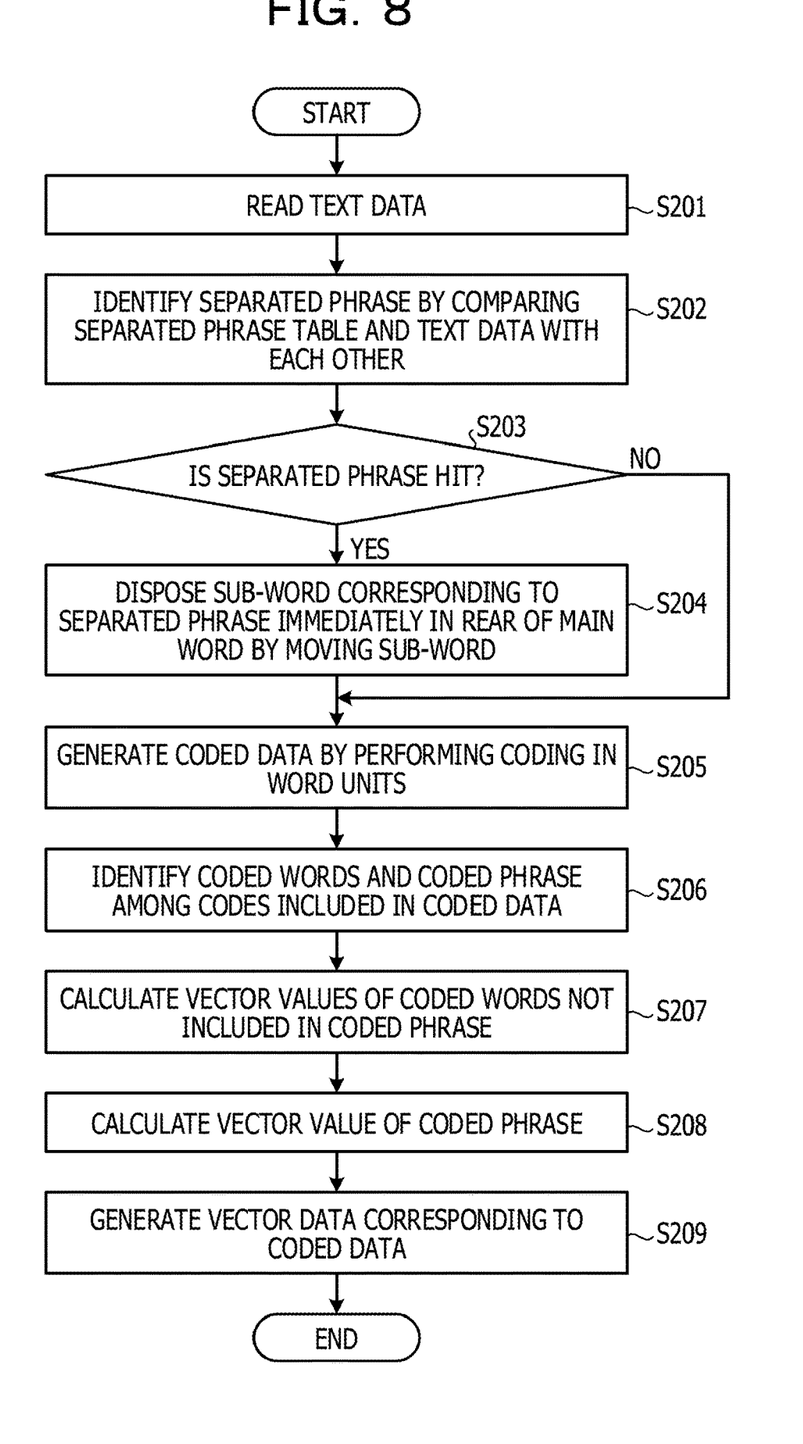
FIG. 8 is a flowchart illustrating a processing procedure of an analysis device according to the present second embodiment.

FIG. 8 is a flowchart illustrating a processing procedure of an analysis device according to the present second embodiment. As illustrated in FIG. 8, the separated phrase processing unit 250b of the analysis device 200 reads the text data 240a (step S201). The separated phrase processing unit 250b identifies a separated phrase by comparing the separated phrase table 240c and the text data 240a with each other (step S202).

When the separated phrase processing unit 250b does not hit a separated phrase (No in step S203), the separated phrase processing unit 250b proceeds to step S205. When the separated phrase processing unit 250b hits a separated phrase (Yes in step S203), the separated phrase processing unit 250b proceeds to step S204. The separated phrase processing unit 250b disposes a sub-word corresponding to the separated phrase immediately in the rear of a main word by moving the sub-word (step S204).

The coding unit 250c of the analysis device 200 generates the coded data 240b by coding the text data 241a in word units based on the dictionary data 240d (step S205).

The phrase identifying unit 250d of the analysis device 200 identifies coded words (coded words not included in a coded phrase) and the coded phrase among the codes included in the coded data 240b based on the phrase definition data 240e (step S206).

The vector arithmetic unit 250e of the analysis device 200 calculates the vector values of the coded words not included in the coded phrase according to the conditions of appearance of the coded words (step S207). The vector arithmetic unit 250e calculates the vector value of the coded phrase according to the conditions of appearance of the coded phrase (step S208). The vector arithmetic unit 250e generates the vector data 240f corresponding to the coded data 240b (step S209).

As described above, the analysis device 200 may identify a separated phrase as a coded phrase even when the separated phrase is present in the text data 20a. Therefore, it is possible to suppress calculation of a vector value for each of the codes of words constituting the separated phrase, and improve analysis accuracy.

Incidentally, when relation between each coded word and a vector value is known, the analysis device 100 (200) described in the present embodiment may vectorize text data using an automaton that associates each coded word with a vector value.

Figure 9:
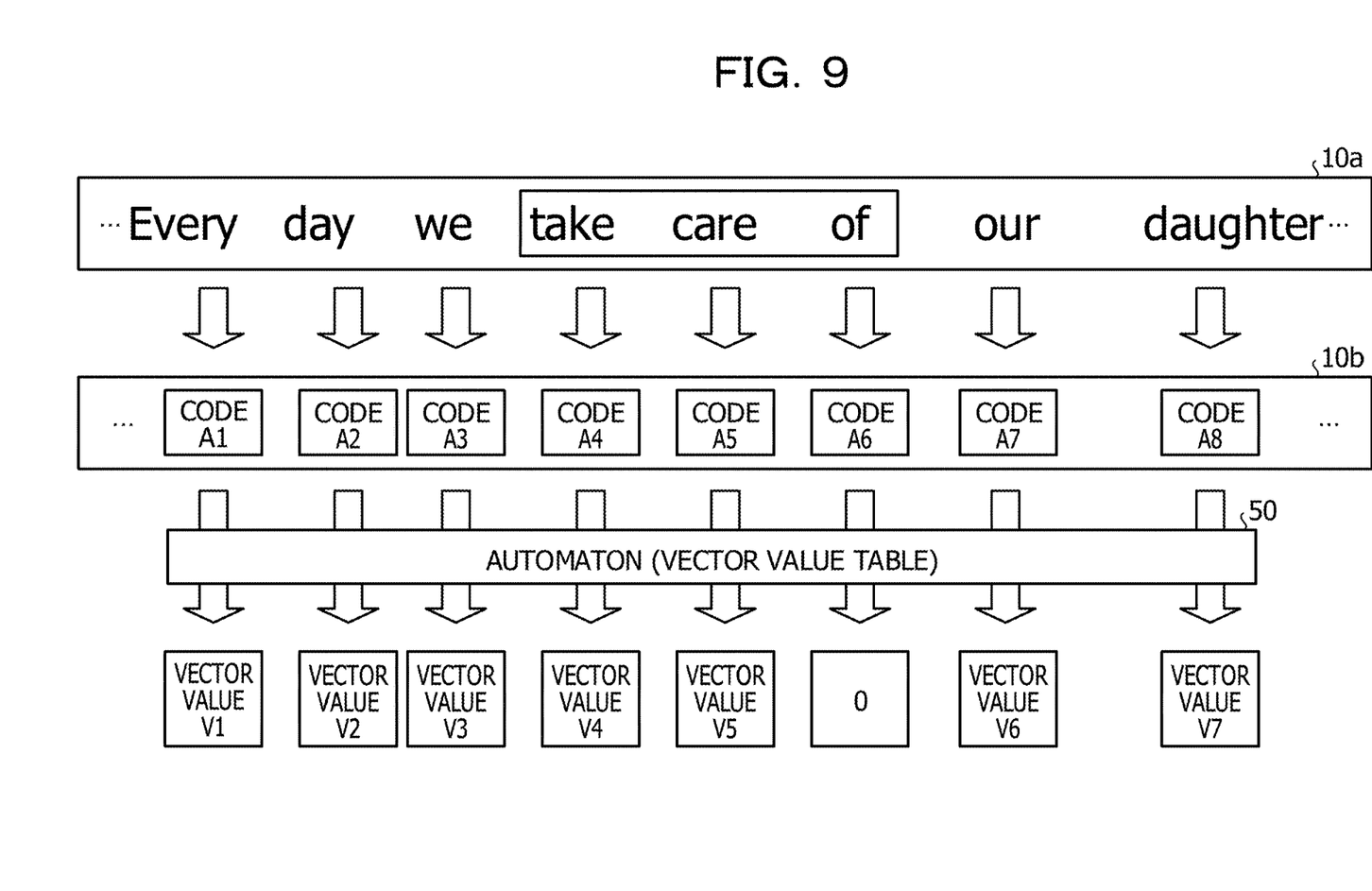
FIG. 9 is a diagram of assistance in explaining an example of vector operation using an automaton.

FIG. 9 is a diagram of assistance in explaining an example of vector operation using an automaton. Suppose in the example illustrated in FIG. 9 that text data is "Every day we take care of our daughter." The analysis device 100 generates the coded data 10b by coding each word included in the text data 10a in word units as in FIG. 1.

Next, the analysis device 100 converts each coded word into a vector value by comparing the coded data 10b with an automaton 50. Here, the automaton 50 is information that associates each coded word with a vector value. Incidentally, the automaton 50 sets vector values corresponding to coded words corresponding to stop words or the like to "0."

In the example illustrated in FIG. 9, the codes A1 to A5 and the codes A6 to A8 are converted into vector values V1 to V7 by the conversion using the automaton 50. Incidentally, the code A6 is a coded word corresponding to a step word, and therefore the vector value of the code A6 is set to zero.

When the coded data 10b is vectorized using the automaton 50 as described above, the speed of the vectorizing processing may be increased.

Figure 10:
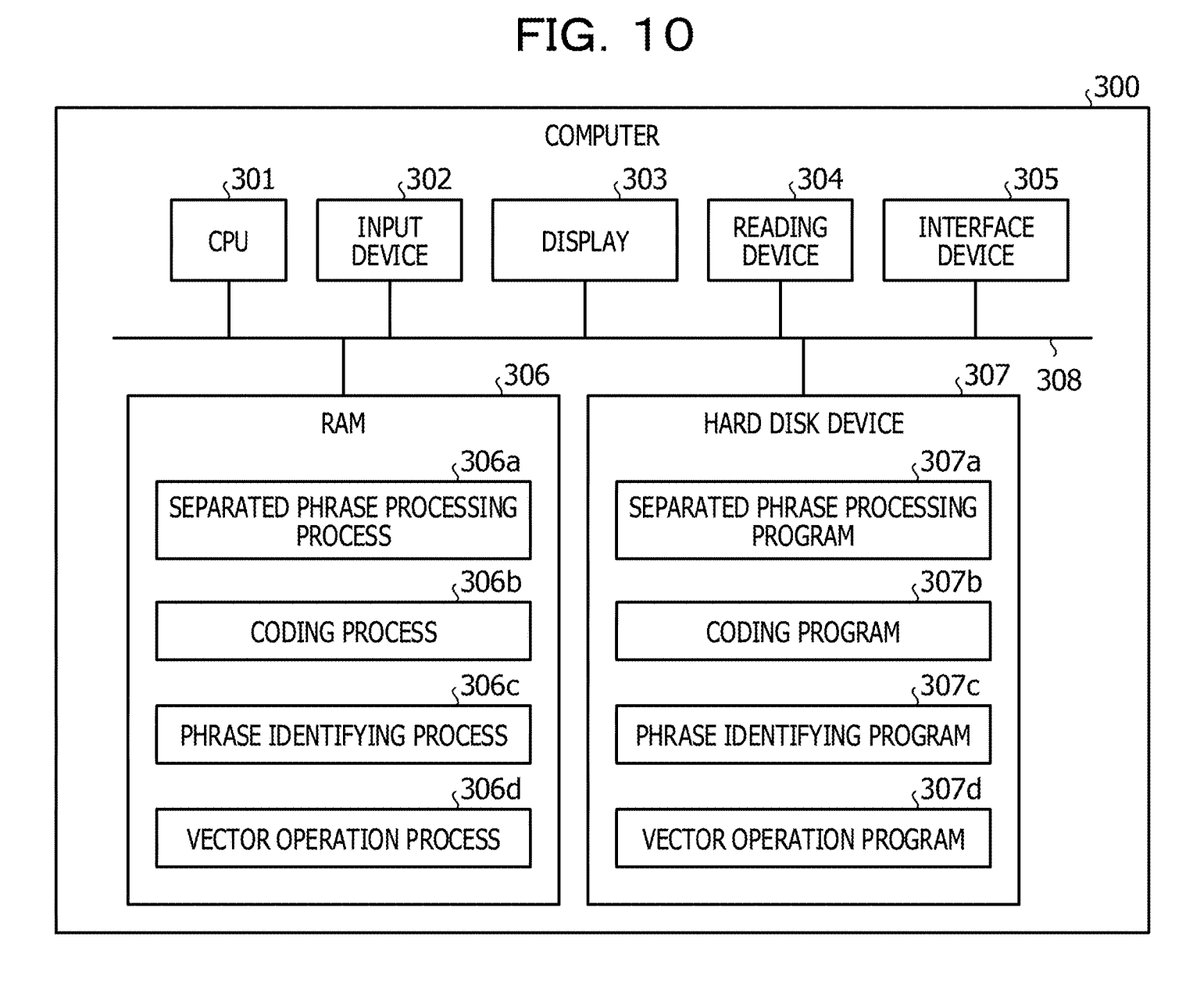
FIG. 10 is a diagram illustrating an example of a hardware configuration of a computer that implements functions similar to those of analysis devices.

Description will next be made of an example of a hardware configuration of a computer that implements functions similar to the analysis devices 100 and 200 illustrated in the foregoing embodiments. FIG. 10 is a diagram illustrating an example of a hardware configuration of a computer that implements functions similar to those of analysis devices.

As illustrated in FIG. 10, a computer 300 includes a CPU 301 that executes various kinds of arithmetic processing, an input device 302 that receives input of data from a user, and a display 303. The computer 300 also includes a reading device 304 that reads a program or the like from a storage medium and an interface device 305 that sends and receives data to and from another computer via a network. The computer 300 also includes a RAM 306 that temporarily stores various kinds of information and a hard disk device 307. The respective devices 301 to 307 are coupled to a bus 308.

The hard disk device 307 includes a separated phrase processing program 307a, a coding program 307b, a phrase identifying program 307c, and a vector operation program 307d. The CPU 301 reads the separated phrase processing program 307a, the coding program 307b, the phrase identifying program 307c, and the vector operation program 307d, and expands the separated phrase processing program 307a, the coding program 307b, the phrase identifying program 307c, and the vector operation program 307d in the RAM 306.

The separated phrase processing program 307a functions as a separated phrase processing process 306a. The coding program 307b functions as a coding process 306b. The phrase identifying program 307c functions as a phrase identifying process 306c. The vector operation program 307d functions as a vector operation process 306d.

Processing of the separated phrase processing process 306a corresponds to processing of the separated phrase processing unit 250b. Processing of the coding process 306b corresponds to processing of the coding units 150b and 250c. Processing of the phrase identifying process 306c corresponds to processing of the phrase identifying units 150c and 250d. Processing of the vector operation process 306d corresponds to processing of the vector arithmetic units 150d and 250e.

Incidentally, the programs 307a to 307d do not necessarily need to be stored in the hard disk device 307 from the beginning. For example, the respective programs are stored on a "portable physical medium" such as a flexible disk (FD), a compact disc (CD)-ROM, a digital versatile disc (DVD) disk, a magneto-optical disk, an integrated circuit (IC) card, or the like to be inserted into the computer 300. Then, the computer 300 may read and execute the respective programs 307a to 307d.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An analysis device comprising:
a memory; and
a processor coupled to the memory and the processor configured to:
acquire a document for analyzing,
identify, from a text data included in the document, a separated phrase composed of a set of a first word, a second word, and a stop word between the first word and the second word, by comparing the separated phrase to a phrase definition data,
when the second word is detected at a position which is a stop word away from the first word, order words of the text data included in the document so that the second word is located at the position immediately following the first word,
generate a coded document including a plurality of coded words by coding the ordered words in accordance with dictionary data indicating a correspondence between each word and each coded word,
determine a vector value according to a condition of appearance of a first coded phrase relative to neighboring coded words in the coded document, the first coded phrase corresponding to a combination of two or more coded words included in the plurality of coded words, corresponding to the first word, the second word and the stop word, and
assign the vector value to the first coded phrase and a specific vector value to a code corresponding to another stop word indicating articles or prepositions from the text data by comparing the coded document with information which associates each coded stop word with the specific vector value.

2. The analysis device according to claim 1, the processor further configured to assign another vector value to a first coded word included in the plurality of coded words, the other vector value being determined according to a condition of appearance of the first coded word in the coded document.

3. The analysis device according to claim 1, wherein the vector value is determined by applying modeling based on Skip-gram to second coded words or second coded phrases located in front and in a rear of the first coded phrase in the coded document, and identifying a probability that the second coded words or the second coded phrases appear in front and in the rear of the first coded phrase in the coded document.

4. The analysis device according to claim 1, wherein a number of separating words between the first word and the second word is associated with the definition information of the phrase, and the changing process is executed when a number of words between the first word and the second word in the sentence does not exceed the number of separating words.

5. An analysis method executed by a computer, the method comprising:
acquiring a document for analyzing;
identifying, from a text data included in the document, a separated phrase composed of a set of a first word, a second word, and a stop word between the first word and the second word, by comparing the separated phrase to a phrase definition data,
when the second word is detected at a position which is a stop word away from the first word, ordering words of the text data included in the document so that the second word is located at the position immediately following the first word;
generating a coded document including a plurality of coded words by coding the ordered words in accordance with dictionary data indicating a correspondence between each word and each coded word;
determining a vector value according to a condition of appearance of a first coded phrase relative to neighboring coded words in the coded document, the first coded phrase corresponding to a combination of two or more coded words included in the plurality of coded words, corresponding to the first word, the second and the stop word; and
assigning the vector value to the first coded phrase and a specific vector value to a code corresponding to another stop word indicating articles or prepositions from the text data by comparing the coded document with information which associates each coded stop word with the specific vector value.

6. The analysis method according to claim 5, further comprising: assigning another vector value to a first coded word included in the plurality of coded words, the other vector value being determined according to a condition of appearance of the first coded word in the coded document.

7. The analysis method according to claim 5, wherein the vector value is determined by applying modeling based on Skip-gram to second coded words or second coded phrases located in front and in a rear of the first coded phrase in the coded document, and identifying a probability that the second coded words or the second coded phrases appear in front and in the rear of the first coded phrase in the coded document.

8. The analysis method according to claim 5, wherein a number of separating words between the first word and the second word is associated with the definition information of the phrase, and the changing process is executed when a number of words between the first word and the second word in the sentence does not exceed the number of separating words.

9. A non-transitory computer-readable medium storing an analysis program that causes a computer to execute a process comprising:
  acquiring a document for analyzing;
  identifying, from a text data included in the document, a separated phrase composed of a set of a first word, a second word, and a stop word between the first word and the second word, by comparing the separated phrase to a phrase definition data,
  when the second word is detected at a position which is a stop word away from the first word, ordering words of the text data included in the document so that the second word is located at the position immediately following the first word;
  generating a coded document including a plurality of coded words by coding the ordered words in accordance with dictionary data indicating a correspondence between each word and each coded word;
  determining a vector value according to a condition of appearance of a first coded phrase relative to neighboring coded words in the coded document, the first coded phrase corresponding to a combination of two or more coded words included in the plurality of coded words, corresponding to the first word, the second and the stop word; and
  assigning the vector value to the first coded phrase and a specific vector value to a code corresponding to another stop word indicating articles or prepositions from the text data by comparing the coded document with information which associates each coded stop word with the specific vector value.

10. The analysis device according to claim 1, wherein
the combination of two or more coded words corresponds to a combination of two or more words constituting an idiom in the document.

11. The analysis method according to claim 5, wherein
the combination of two or more coded words corresponds to a combination of two or more words constituting an idiom in the document.

* * * * *